United States Patent
Inoue et al.

(10) Patent No.: US 8,511,732 B2
(45) Date of Patent: Aug. 20, 2013

(54) PICK-UP STYLE UTILITY VEHICLE WITH EXPANDABLE CARGO BED

(75) Inventors: Masafumi Inoue, Miki (JP); Kiyohito Takano, Kobe (JP); Mike Boyle, Lincoln, NE (US); Scott Gordon, Lincoln, NE (US)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 351 days.

(21) Appl. No.: 12/648,594

(22) Filed: Dec. 29, 2009

(65) Prior Publication Data
US 2011/0156428 A1    Jun. 30, 2011

(51) Int. Cl.
 *B62D 25/00* (2006.01)
(52) U.S. Cl.
 USPC .................................. 296/26.09; 296/26.08
(58) Field of Classification Search
 USPC ............ 296/26.09, 26.1, 26.11, 183.1, 26.08, 296/186.4, 186.5, 190.11
 See application file for complete search history.

(56) References Cited

U.S. PATENT DOCUMENTS

| | | | | | |
|---|---|---|---|---|---|
| 1,249,793 | A | * | 12/1917 | Adams | 296/26.11 |
| 1,419,475 | A | * | 6/1922 | Smith | 296/26.13 |
| 1,980,027 | A | * | 11/1934 | Adams | 56/122 |
| 2,764,304 | A | * | 9/1956 | Johnson, Jr. | 414/491 |
| 3,063,665 | A | * | 11/1962 | Lincoln | 248/637 |
| 4,087,007 | A | * | 5/1978 | Drews | 414/545 |
| 5,106,255 | A | * | 4/1992 | Motoda et al. | 414/540 |
| 5,193,878 | A | * | 3/1993 | Weaver | 296/162 |
| 6,896,307 | B2 | * | 5/2005 | Nye et al. | 296/26.01 |
| 6,905,159 | B1 | | 6/2005 | Saito et al. | |
| 6,994,388 | B2 | | 2/2006 | Saito et al. | |
| 7,249,798 | B2 | | 7/2007 | Saito et al. | |
| 7,578,094 | B2 | * | 8/2009 | Rogers et al. | 49/138 |
| 2007/0090661 | A1 | * | 4/2007 | Shagbazyan | 296/26.09 |

\* cited by examiner

*Primary Examiner* — Glenn Dayoan
*Assistant Examiner* — Sunsurraye Westbrook
(74) *Attorney, Agent, or Firm* — Wenderoth, Lind & Ponack, LLP

(57) ABSTRACT

A pick-up type utility vehicle with an expandable cargo bed. The pick-up type utility vehicle includes a front seat, a rear seat; a cargo bed, and a screen separating the rear seat and the cargo bed. The pick-up type utility vehicle further includes an operating part for moving the screen, and a movement mechanism moving the screen in the front and back direction by operation of the operating part.

8 Claims, 14 Drawing Sheets

PICK-UP STYLE UTILITY VEHICLE WITH EXPANDABLE CARGO BED

BACKGROUND OF THE INVENTION

1. Field of the Invention

The present invention relates to the pick-up type utility vehicle.

2. Description of the Related Art

Generally, a pick-up type utility vehicle has a comparatively large cargo bed in the division behind the seat in comparison with the bar steering wheel type utility vehicle belonging to all terrain vehicles. Therefore, the pick-up type utility vehicle is used for practical use such as movement in golf courses, golf course maintenance, hunting in fields, conveyance of lumber, and the like.

The present applicants have formerly developed inventions relating to the pick-up style utility vehicle with an expandable cargo bed. These applications have been filed and registered. For example, these are U.S. Pat. Nos. 6,905,159; 6,994,388; and 7,249,798.

FIG. 13 shows the pick-up type utility vehicle 901 described in each of the above documents. The pick-up type utility vehicle 901 has a front seat 902, a rear seat 903, and a cargo bed CN. The cargo bed CN is configured by a bottom plate 907 and a plate part 904 which is arranged on the bottom plate 907. The pick-up type utility vehicle 901 can change a normal state where 4 passengers can ride the pick-up type utility vehicle 901, and an expanded state where 2 passengers can ride the pick-up type utility vehicle 901 and the cargo bed is expanded. In addition, a screen 905 is arranged on the bottom plate 907 between the plate part 904 and the rear seat 903.

FIG. 14 is a side view which shows the pick-up type utility vehicle 901 in the normal state. In the normal state, a passenger can ride on both the front seat 902 and the rear seat 903. The rear seat 903 is rotatably supported around a horizontal shaft 935 which is arranged at the front end portion of the rear seat 903. In FIG. 14, the rear seat 903 in the use position P1 and the cargo bed CN in the normal state are shown. The rear seat 903 in the use position P1 indicates the rear seat 903 which is on the bottom plate 907.

FIG. 15 is a side view which shows the pick-up type utility vehicle 901 in the expanded state. In the expanded state, the rear seat 903 is in the shunting position P2. The rear seat 903 in the shunting position P2 is standing and is forward relative to the bottom plate 907. Therefore, a passenger can not ride on the rear seat 903 in the shunting position P2. On the other hand, as the rear seat 903 shunts forward relative to the bottom plate 907, the whole surface of the bottom plate 907 is opened. Therefore, the cargo bed CE in the expanded state is expanded relative to the cargo bed CN in the normal state.

Change from the normal state to the expanded state is performed as follows. Firstly, the rear seat 903 which is rotatable around the horizontal shaft 935 is toppled forward from the use position P1 to the shunting position P2. Secondly, the position of the screen 905 is changed forward depending on the change of the position of the rear seat 903. As a result, the front portion of the bottom plate 907 is opened, too. Therefore, the whole surface of the bottom plate 907 can be used as the bottom surface of the cargo bed. In addition, the expansion side plate is stored in the plate part 904, and the expansion side plate 943 is expanded forward. In this way, the cargo bed CE in the expanded state is constituted.

FIG. 16 shows one example of the screen shield 905. For example, the screen shield 905 consists of steel frames and wire nettings. Therefore, the screen shield 905 is a heavy load. In addition, the screen shield 905 is supported in the chassis by inserting projection portions 905a, 905a of the screen shield 905 in attachment bores arranged in both end portions of the chassis in the right and left direction. In other words, it is necessary to lift the screen shield 905 in order to move the screen shield 905. Therefore, two persons were necessary to change a position of the screen shield 905, and it was difficult to work only with one person.

SUMMARY OF THE INVENTION

The present inventions have been made in view of the above problems. An object of the present inventions is to make lifting the screen unnecessary for movement of the screen with the change of the cargo bed.

The first invention provides a pick-up type utility vehicle with an expandable cargo bed, comprising: a front seat; a rear seat; the cargo bed; and a screen separating between the rear seat and the cargo bed, on the chassis. The pick-up type utility vehicle further comprises an operating part for moving the screen; and a movement mechanism for moving the screen in the front and back direction by operation of the operating part.

According to the first invention, in the pick-up type utility vehicle, it is not necessary to lift the screen for movement of the screen accompanying changes of states in the cargo bed.

Configurations (1) to (5) may be preferably adapted for the first invention.

In configuration (1), the movement mechanism is configured by: a sprocket rotating by the rotative force generated by operation of the operating part; and a chain belt gearing the sprocket.

In configuration (2), the movement mechanism is configured by a feed screw.

In configuration (3), the movement mechanism is in frictional contact with the cargo bed and is configured by a roller rotating because of the rotative force.

In configuration (4), the pick-up type utility vehicle includes an interlocking device which moves the rear seat in conjunction with the screen.

In configuration (5), the operating part is removably arranged in the movement mechanism.

DETAILED DESCRIPTION OF THE PREFERRED EMBODIMENTS

First Embodiment

Figure 3:
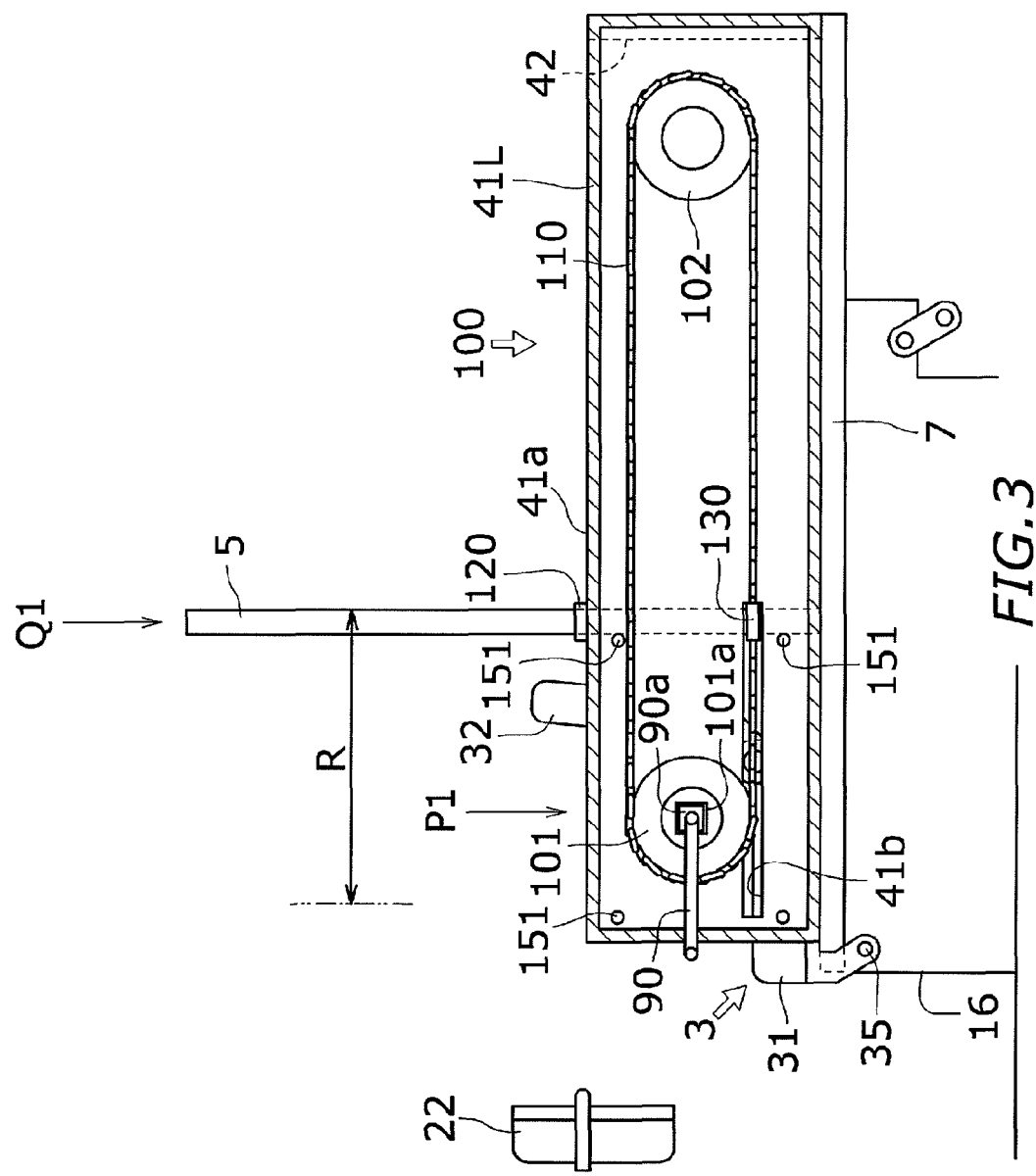
FIG. 3 is a side view which shows the cargo bed in the normal state (the first embodiment).
Figure 4:
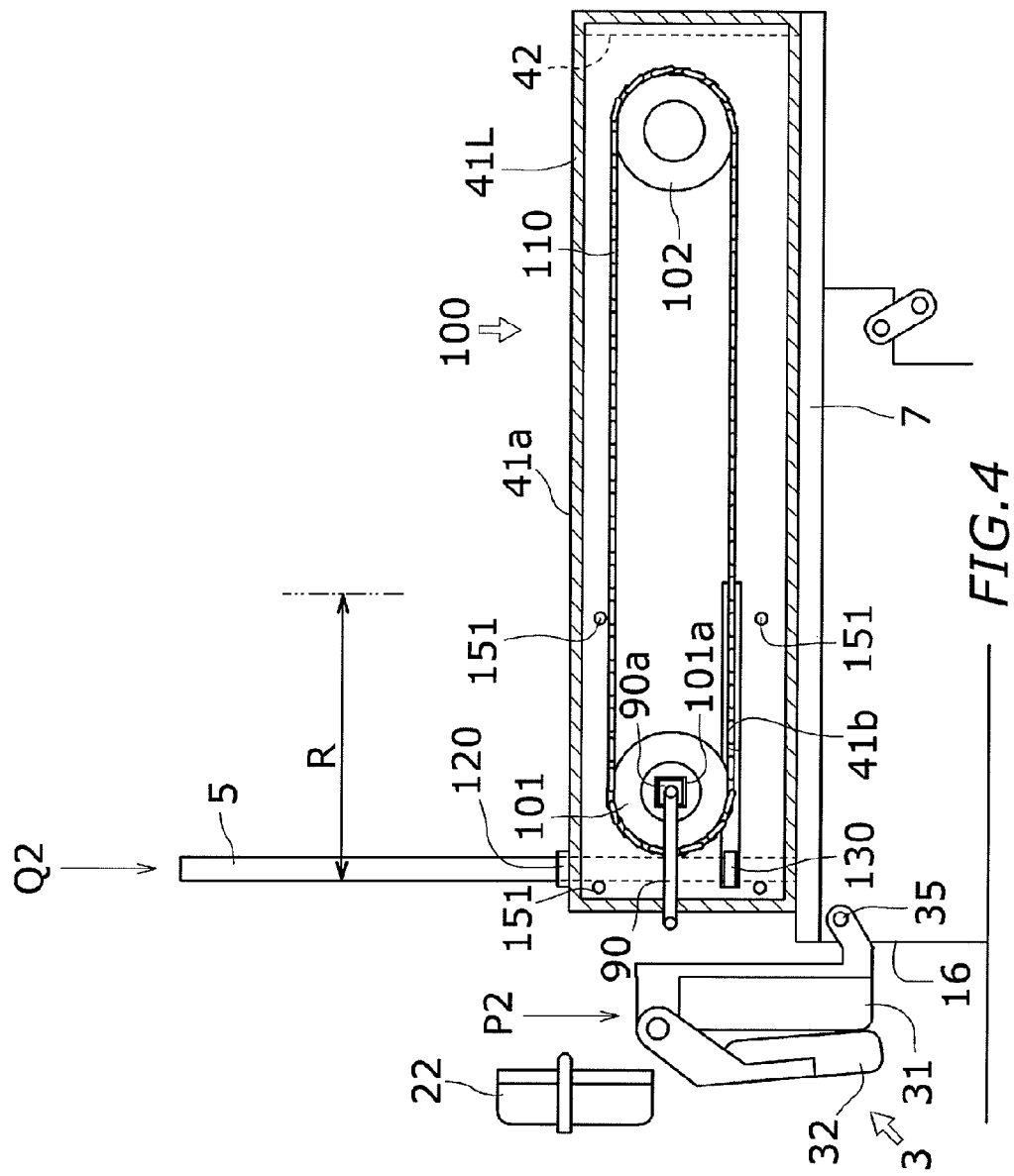
FIG. 4 is a side view which shows the cargo bed in the expanded state (the first embodiment).

The pick-up type utility vehicle 1 can expand the capacity of the cargo bed 4 forward by moving the screen 5 forward. About the cargo bed 4, a state before the expansion is the normal state (FIG. 1, FIG. 2, and FIG. 3), and a state after the expansion is the expanded state (FIG. 4). The constitution of the pick-up type utility vehicle 1 is explained based on a drawing in detail as follows.

Figure 1:
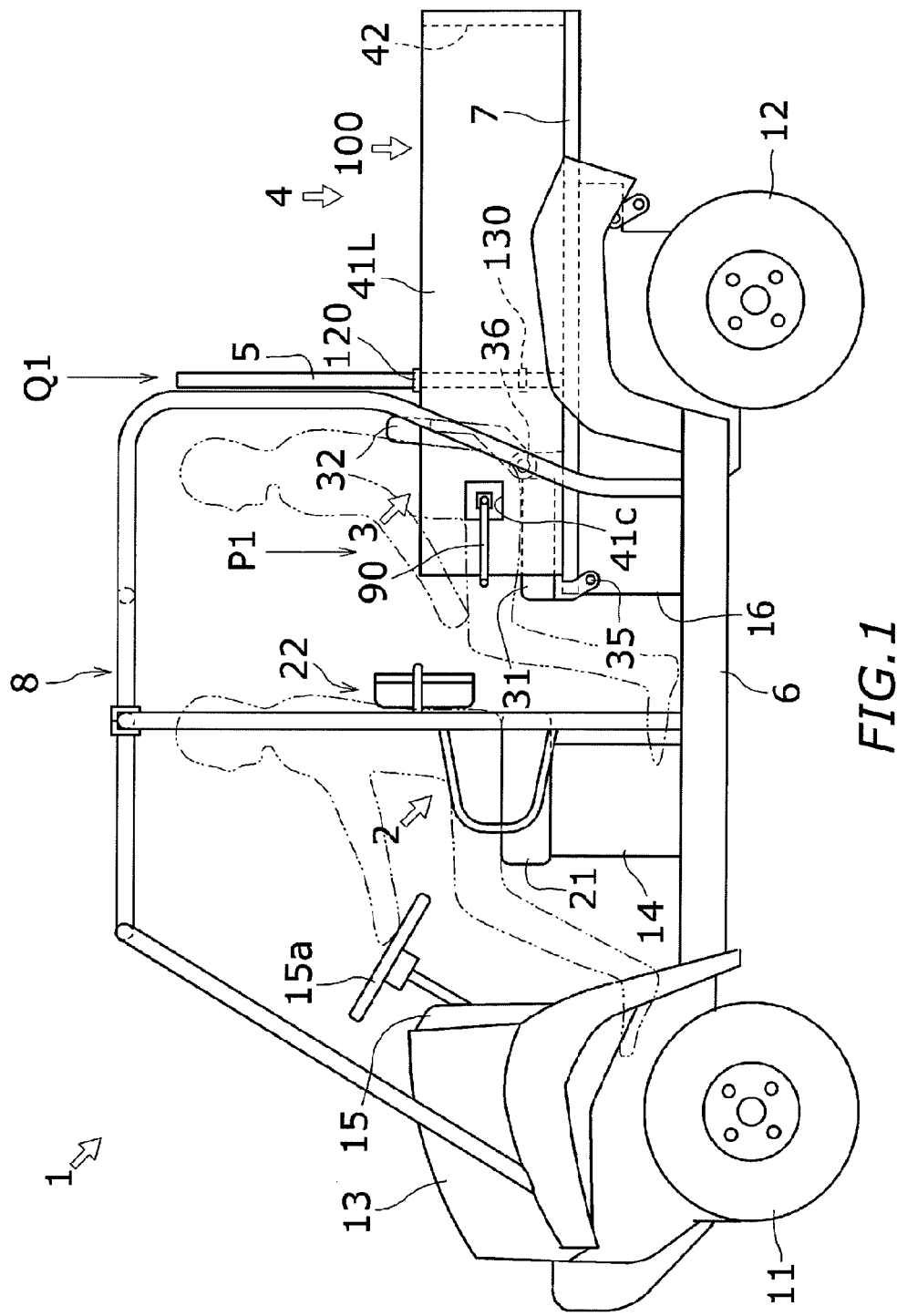
FIG. 1 is a side view which shows the pick-up type utility vehicle in the normal state (the first embodiment).

FIG. 1 is a side view which shows the pick-up type utility vehicle 1 in the normal state. The pick-up type utility vehicle 1 has a chassis 6 which has a pair of right and left front wheels 11, and a pair of right and left rear wheels 12. On the chassis 6, a hood 13, a front support stand 14, and a rear support stand are arranged in turn from the front side. A dashboard 15 (an operating portion) which has a steering wheel 15a is arranged in the rear of the hood 13. A front seat 2 is arranged on the upper side of the front support stand 14. The rear seat 3 and the cargo bed 4 are arranged on the rear support stand 16. The cargo bed 4 includes a bottom plate 7 and a screen 5. In addition, a cabin frame 8 is arranged to surround the dashboard 15, the front seat 2, and the rear seat 3. The cabin frame 8 is fixed to the chassis 6. A cabin is formed in the inside surrounded by the chassis 6 and the cabin frame 8.

The front seat 2 and the rear seat 3 are bench type seats which are long in the right and left direction. In the present embodiment, two persons can sit alongside each other on each of the front seat 2 and the rear seat 3.

In FIG. 1, the front seat 2 has a front main seat 21 and a front backrest 22. The front main seat 21 is fixed to the front support stand 14. The front backrest 22 is fixed to the cabin frame 8.

In FIG. 1, the rear seat 3 has a rear main seat 31, a rear backrest 32, and a horizontal shaft 36. The lower end of the rear backrest 32 is rotatably supported by the rear main seat 31 around the horizontal shaft 36. The horizontal shaft 36 is a shaft oriented in the right and left direction. The rear main seat 31 is rotatably supported by the rear support stand 16 around a horizontal shaft 35.

Figure 2:
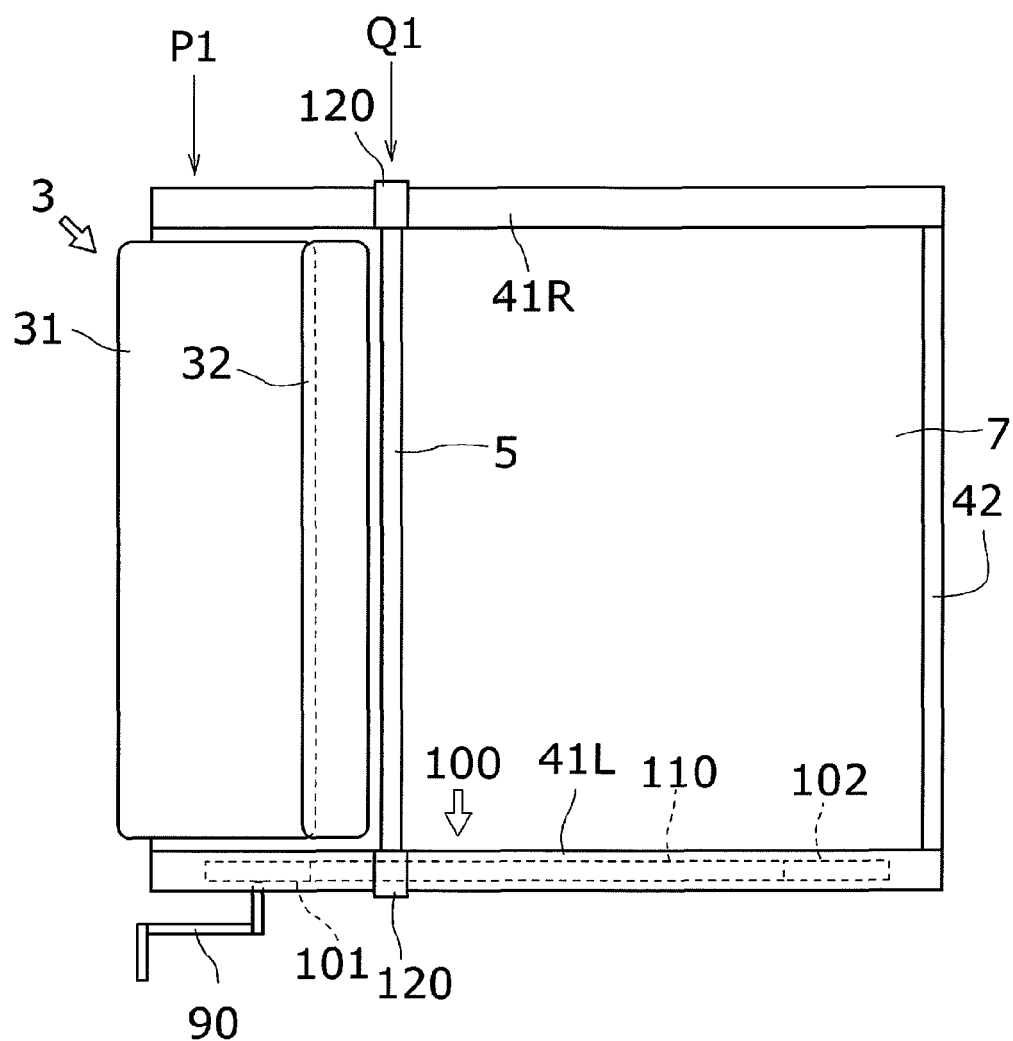
FIG. 2 is a plan view which shows the cargo bed in the normal state (the first embodiment).

As the rear main seat 31 is rotatable around the horizontal shaft 35, the rear seat 3 is movable between the use position P1 and the shunting position P2. The use position P1 is shown in FIG. 1-FIG. 3. In the use position P1, the passengers can ride on the rear seat 3. The shunting position P2 is shown in FIG. 4. Although mentioned later in detail, the screen 5 can move forward by moving the rear seat 3 to the shunting position P2.

FIG. 2 is a plan view which shows the cargo bed 4 in the normal state. The cargo bed 4 is configured by the bottom plate 7, the screen 5, two side cases 41L and 41R, and a rear plate 42. The bottom plate 7 is fixed to the rear support stand 16. The two side cases 41L and 41R are fixed to the end of the bottom plate 7 in the right and left direction. The rear plate 42 is arranged at the rear end of the bottom plate 7. The screen 5 is arranged on the bottom plate 7 so that the screen 5 faces the rear plate 42. Here, the bottom plate 7 configures the bottom surface of the cargo bed 4. The two side cases 41L and 41R configure the side surfaces. The rear plate 42 configures the rear surface of the cargo bed 4. The screen 5 configures the front surface of the cargo bed 4.

FIG. 3 is a side view which shows the cargo bed 4 in the normal state. In FIG. 3 (the normal state), the rear seat 3 is in the use position P1, the screen 5 is a rear side position Q1.

The pick-up type utility vehicle 1 has a steering wheel 90 (the operating part) and a movement mechanism 100 as a means for moving the screen 5. The movement mechanism 100 moves the screen 5 in the front and back direction by the rotative force generated by rotation of the steering wheel 90. The movement mechanism 100 is stored in a side case 41L of the left side. The side case 41L is a hollow case.

In FIG. 3, the movement mechanism 100 has a first sprocket 101, a second sprocket 102, and a chain belt 110. The first sprocket 101 and the second sprocket 102 are rotatably supported by the side case 41L. The first sprocket 101 is arranged at the front portion in the side case 41L, and the second sprocket 102 is arranged at the rear portion in the side case 41L. The chain belt 110 is wound around the first sprocket 101 and the second sprocket 102. An engagement hole 101a is formed in the shaft center portion of the first sprocket 101. The distal portion 90a of the steering wheel 90 engages the engagement hole 101a. In addition, the movement mechanism 100 has a slider 120 and a connecting tool 130. The slider 120 is fixed to the left end portion of the screen 5. The slider 120 is arranged so that the slider 120 contacts the upper surface 41a of the side case 41L. The connecting tool 130 connects the left end portion of the screen 5 and the chain belt 110.

The passengers can move the screen 5 by rotating the steering wheel 90. First, the first sprocket 101 rotates by rotation of the steering wheel 90. By rotation of the first sprocket 101, the chain belt 110 drives and the connecting tool 130 moves in the front and back direction. Therefore, the screen 5 moves in the front and back direction. In FIG. 3, when the steering wheel 90 rotates in the clockwise direction, the first sprocket 101 rotates in the clockwise direction. At this time, the upper portion of the chain belt 110 moves backward, and the lower portion of the chain belt 110 moves forward. Here, the connecting tool 130 is fixed to the lower portion of the chain belt 110. Therefore, the screen 5 moves forward by rotation of the steering wheel 90 in the clockwise direction. On the contrary, the screen 5 moves backward by rotation of the steering wheel 90 in the counterclockwise direction.

A guide mechanism of the screen 5 is configured by the slider 120, the connecting tool 130, and the side case 41L. Here, an elongate hole 41b for passing the connecting part 130 is formed in the right wall of the side case 41L. In addition, the connecting tool 130 is arranged so that the connecting tool 130 contacts the upper surface of the elongate hole 41b. Therefore, the posture of the screen 5 under movement is maintained in the slider 120, the connecting tool 130, and the side case 41L.

The screen 5 is movable in a moving range R. The moving range R is a range from the front side position Q2 to the rear side position Q1 in the front and back direction. The capacity of the cargo bed 4 is changed according to the position of the screen 5. As shown in FIG. 3, when the screen 5 is in the rear side position Q1, the cargo bed 4 in the normal state. As shown in FIG. 4, when the screen 5 is in the front side position. Q2, the cargo bed 4 in the expanded state.

In FIG. 3, the steering wheel 90 is removable with respect to the movement mechanism 100'. By pulling the steering wheel 90 to the left side along the axial direction of the first sprocket 101, the engaging of the engagement hole 101a and the distal portion 90a is canceled. On the contrary, when the steering wheel 90 is stuffed into the first sprocket 101, the distal portion 90a engages with the engagement hole 101a. In FIG. 1, the through hole 41c for passing the distal portion 90a of the steering wheel 90 is formed in the left wall of the side case 41L.

In FIG. 3, the movement mechanism 100 further has a lock mechanism of the screen 5. The lock mechanism is configured by two or more pin holes 151 formed in the side case 41L, and a pin which can be inserted in the pin hole 151. The pin holes 151 are respectively set in the positions where the screen 5 in the rear side position Q1 and the front side position Q2 can be locked.

FIG. 4 is a side view which shows the cargo bed 4 in the expanded state. In FIG. 4 (the expanded state), the rear seat 3 is in the shunting position P2, and the screen 5 is in the front side position Q2.

First, the passengers move the rear seat 3 from the use position P1 to the shunting position P2 in the change from the normal state to the expanded state. The rear seat 3 in the shunting position P2 is standing and is at the front side of the bottom plate 7. By shunting the rear seat 3, an empty space occurs in the front portion of the bottom plate 7. The screen 5 can be advanced to the empty space. Second, the passengers move the screen 5 from the rear side position Q1 to the front side position Q2 by operating the steering wheel 90. As a result, the capacity of the cargo bed 4 is extended.

In the first embodiment, the screen 5 can be moved by operation of the steering wheel 90. The capacity of the cargo bed 4 changes with movements of the screen 5. Therefore, in the pick-up type utility vehicle 1, it is not necessary to lift the screen 5 to reposition the screen 5 in accordance with changes of states in the cargo bed 4.

Second Embodiment

Figure 5:
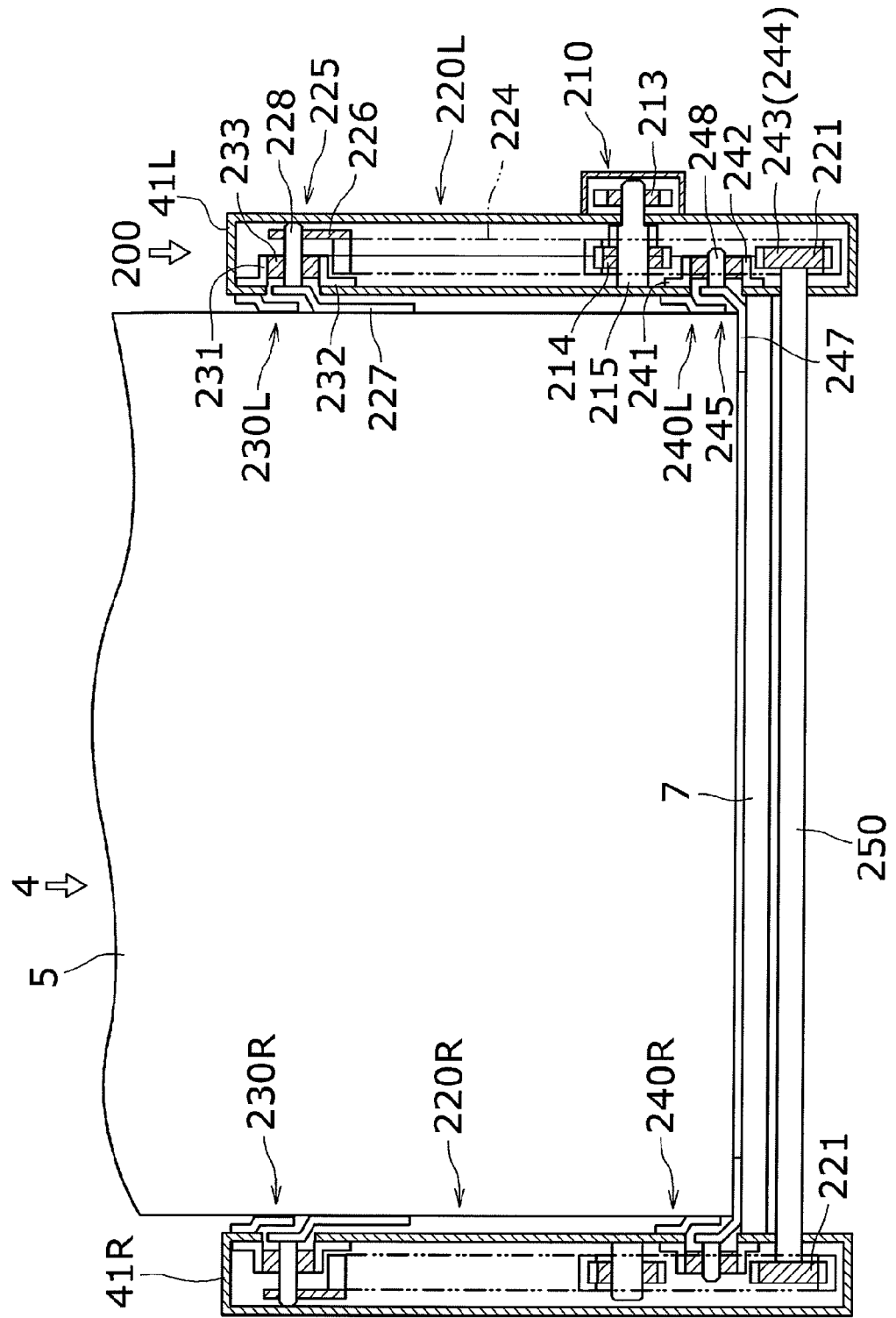
FIG. 5 is a front view which shows the screen and the movement mechanism (the second embodiment).
Figure 6:
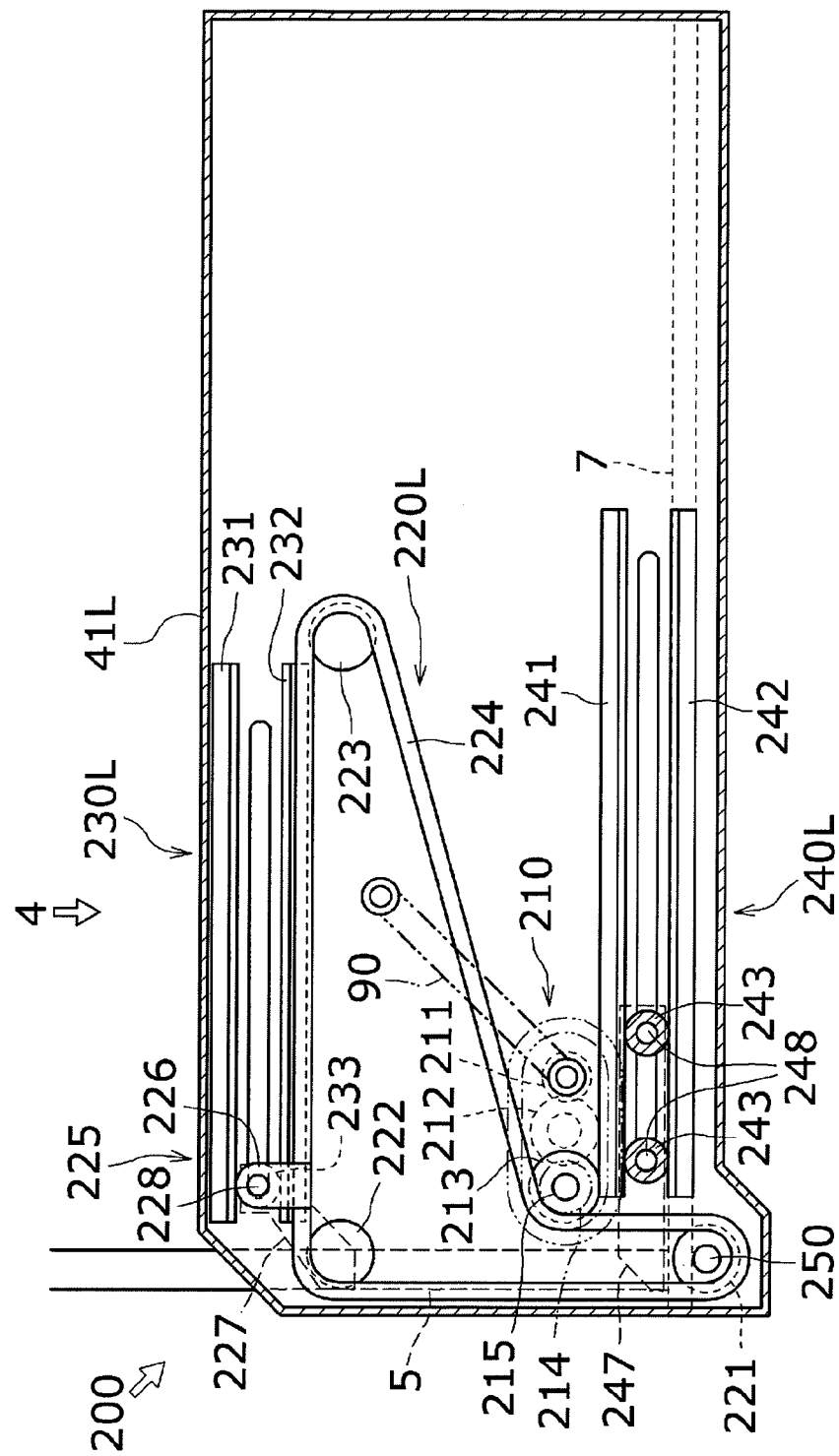
FIG. 6 is a side view which shows the screen and the movement mechanism (the second embodiment).

FIG. 5 and FIG. 6 show the pick-up type utility vehicle 1 in the second embodiment. The second embodiment is similar to the first embodiment except for differences in the movement mechanism. The second embodiment has a movement mechanism 200 instead of the movement mechanism 100 in the first embodiment. The same numerals are used for the portions which are common in the first embodiment and the second embodiment.

FIG. 5 is a front view which snows the screen 5 and the movement mechanism 200. The movement mechanism 200 also moves the screen 5 in the front and back direction by the rotative force generated by rotation of the steering wheel 90. The movement mechanism 200 has a deceleration mechanism 210, main movement mechanisms 220L and 220R, first guide mechanisms 230L and 230R, second guide mechanisms 240L and 240R, a transmission shaft 250. The main movement mechanism 220L, the first guide mechanism 230L, and the second guide mechanism 240L are stored in the side case 41L of the left side. The main movement mechanism 220R, the first guide mechanism 230R, and the second guide mechanism 240R are stored in the side case 41R of the right side.

The operation is as follows. The rotative force by the steering wheel 90 is inputted into the deceleration mechanism 210. The rotative force is transmitted to both sides of the main movement mechanisms 220L and 220R via the transmission shaft 250. As a result, the screen 5 moves in the front and back direction. Here, the posture of the screen 5 under movement is maintained by the first guide mechanisms 230L and 230R, and the second guide mechanisms 240L and 240R.

FIG. 6 is a side view which shows the screen 5 and the movement mechanism 200. Referring to FIG. 5 and FIG. 6, the configuration of the movement mechanism 200 is explained in detail.

In FIG. 6, the deceleration mechanism 210 has a first deceleration sprocket 211, a second deceleration sprocket 212, a third deceleration sprocket 213, and a fourth deceleration sprocket 214. The first deceleration sprocket 211 can removably engage with the distal portion 90a of the steering wheel 90. The second deceleration sprocket 212 engages with the first deceleration sprocket 211, and the third deceleration sprocket 213 engages with the second deceleration sprocket 212. The third deceleration sprocket 213 and the fourth deceleration sprocket 214 are connected via a connecting shaft 215, and rotate integrally. Here, as the diameter of the first deceleration sprocket 211 is smaller than the diameter of the third deceleration sprocket 213, the rotative force is reduced.

In FIG. 6, the main movement mechanism 220L has a first sprocket 221, a second sprocket 222, a third sprocket 223, a chain belt 224, and a connecting tool 225. The sprockets 221, 222, and 223 are rolled with the chain belt 224. The fourth deceleration sprocket 214 of the deceleration mechanism 210 also engages the chain belt 224.

In FIG. 5, the connecting tool 225 connects the chain belt 224 and the screen 5. The connecting tool 225 is configured by, a chain bracket 226, a screen bracket 227, and a connecting shaft 228. The chain bracket 226 is fixed to the upper portion of the chain belt 224. The screen bracket 227 is fixes to the right end portion of the screen 5. The connecting shaft 228 connects the chain bracket 226 and the screen bracket 227. Therefore, the screen 5 interlocks with movement of the chain belt 224. The main movement mechanism 220R has the same configuration as the main movement mechanism 220L.

In FIG. 5, the transmission shaft 250 connects the first sprocket 221 of the main movement mechanism 220L and the first sprocket 221 of the main movement mechanism 220R.

In FIG. 6, the first guide mechanism 230L of the left side has guide rails 231 and 232, and a guide roller 233. The guide rails 231 and 232 are rails which extend toward the front and back direction. The guide rails 231 and 232 are fixed to the side case 41L. The guide roller 233 is arranged between the guide rail 231 and the guide rail 232. Therefore, the guide roller 233 is movable only in the front and back direction.

In FIG. 5, the guide roller 233 is rotatably supported by the above connecting shaft 228. Therefore, the guide roller 233 is supported by the screen 5 via the connecting shaft 228 and the screen bracket 227. The first guide mechanism 230R of the right side has also the same configuration as the first guide mechanism 230L of the left side.

In FIG. 6, of the left side the second guide mechanism 240L has guide rails 241 and 242, and guide rollers 243 and 243. The guide rails 241 and 242 are rails which extend in the front and back direction. The guide rails 241 and 242 are fixed to the side case 41L. The guide rollers 243 and 243 are arranged between the guide rail 241 and the guide rail 242. Therefore, the guide rollers 243 and 243 are movable only in the front and back direction. The guide rollers 243 and 243 are rotatably supported by the screen 5 via a connecting tool 245.

In FIG. 5, the connecting tool 245 is configured by a screen bracket 247 and two connecting shafts 248 and 248. The screen bracket 247 is fixed to the right end portion of the screen 5. Each of the connecting shafts 248 rotatably supports each of the guide rollers 243 and is fixed to the screen bracket 247. The second guide mechanism 240R of the right side is also the same configuration as the second guide mechanism 240L of the left side.

The second embodiment as well as the first embodiment can change the position of the screen 5 by operation of the steering wheel 90.

Third Embodiment

Figure 7:
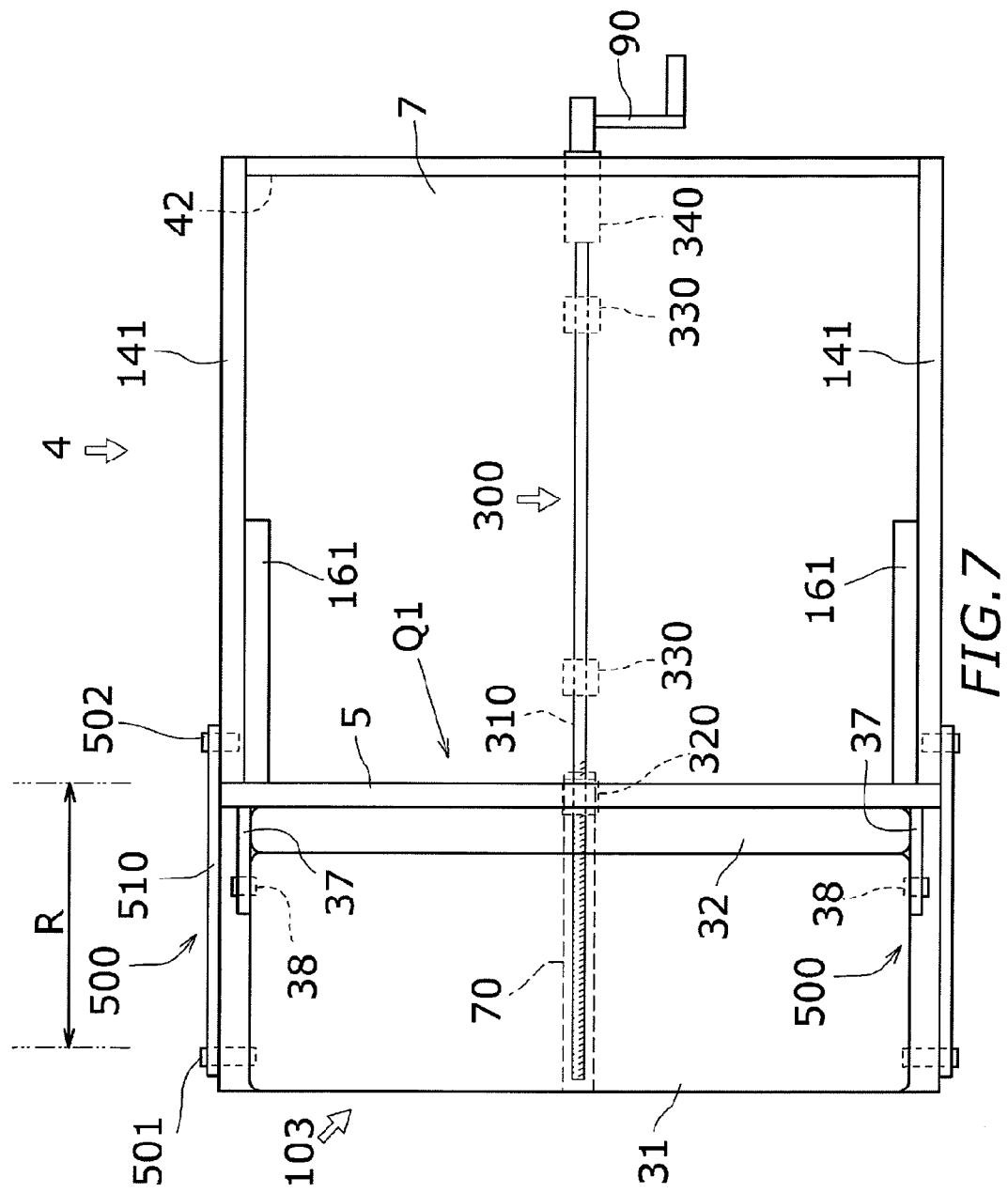
FIG. 7 is a plan view which shows the cargo bed in the normal state (the third embodiment).
Figure 8:
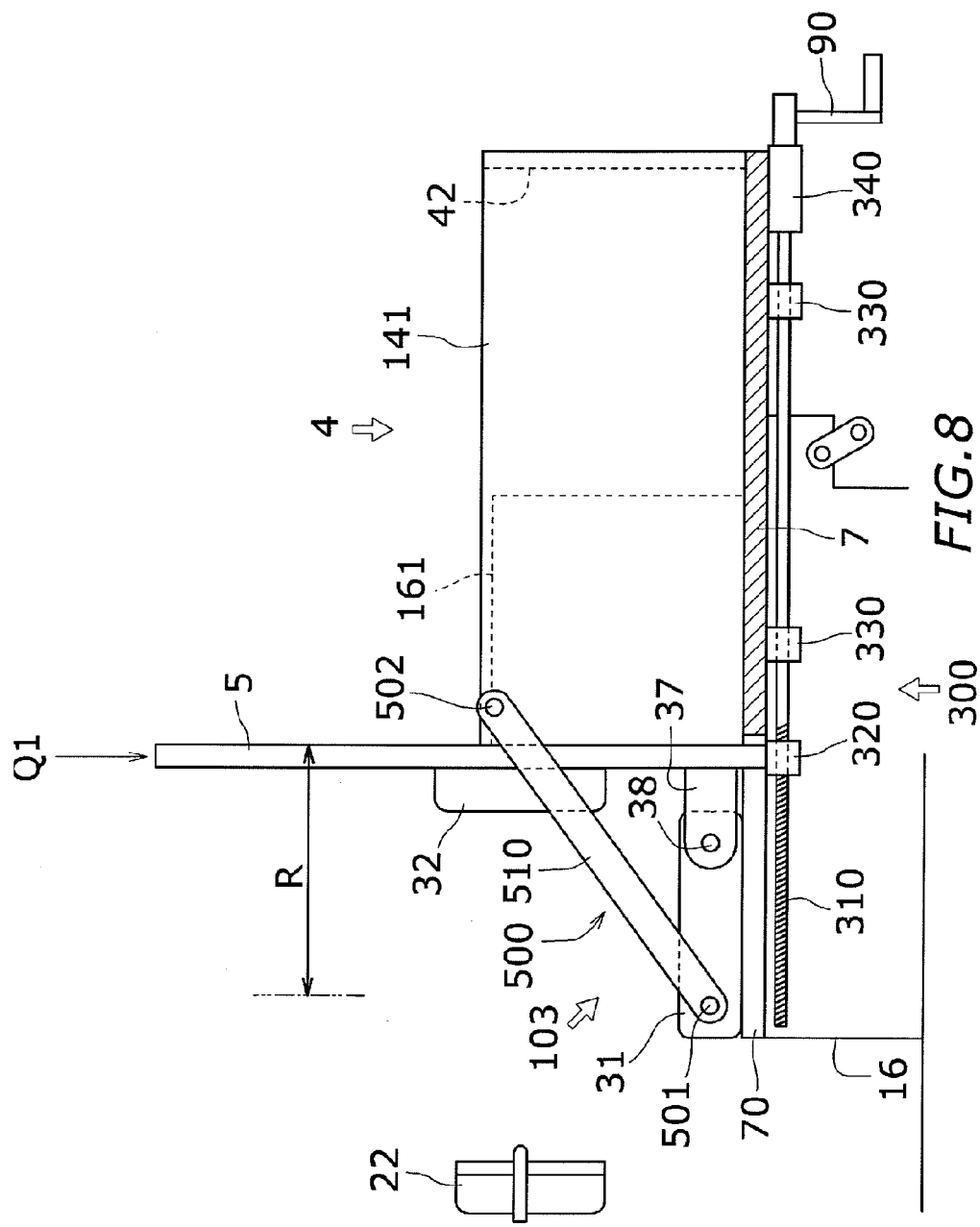
FIG. 8 is a side view which shows the cargo bed in the normal state (the third embodiment).
Figure 9:
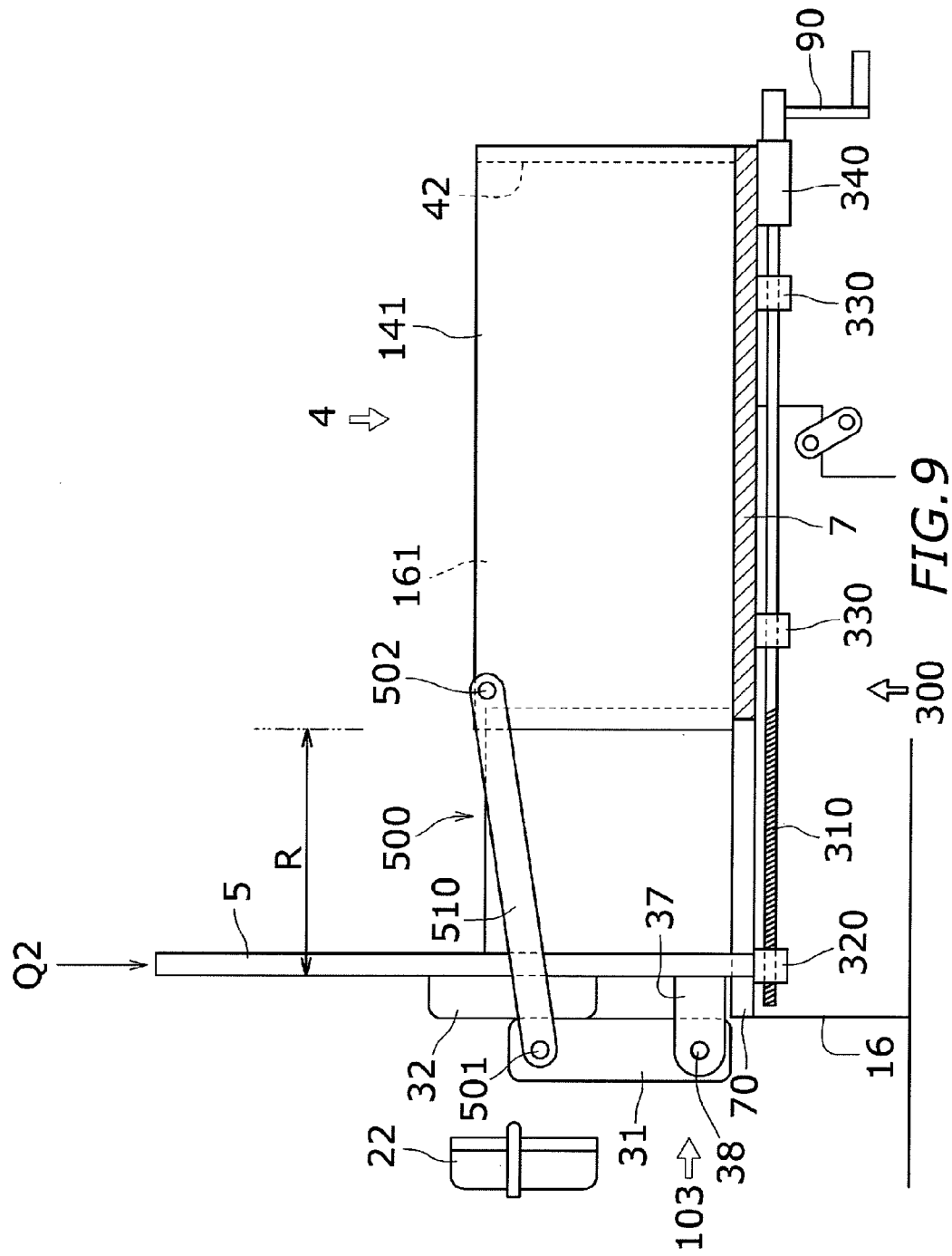
FIG. 9 is a side view which shows the cargo bed in the expanded state (the third embodiment).

FIG. 7-FIG. 9 show the pick-up type utility vehicle 1 in the third embodiment. The third embodiment has the same configuration as the first embodiment except for some points of difference. The third embodiment differs in the configuration of the cargo bed 4 from the first embodiment. The third embodiment has a movement mechanism 300 instead of the movement mechanism 100 in the first embodiment. In addition, the third embodiment has an interlocking device 500. The same numerals are used for the portions that are common in the first embodiment and the third embodiment.

FIG. 7 is a plan view which shows the cargo bed 4 in the normal state. The third embodiment has two side plates 141 and 141 instead of the two side cases 41L and 41R in the first embodiment. The two side plates 141 and 141 are fixed to both ends of the bottom plate 7 in the right and left direction. In addition, the third embodiment has two expansion side plates 161 and 161. The two expansion side plates 161 and 161 are fixed to both ends of the screen 5, and extend backward. In the third embodiment, the cargo bed 4 is configured by the bottom plate 7, the screen 5, the two side plates 141 and 141, the two expansion side plates 161 and 161, the rear plate 42. When the screen 5 is in the rear side position Q1, the expansion side plates 161 and 161 are hidden, and the cargo bed 4 in the normal state is configured. When the screen 5 is in the front side position Q2, the expansion side plates 161 and 161 are exposed, the cargo bed 4 in the expanded state is configured (FIG. 9).

FIG. 8 is a side view which shows the cargo bed 4 in the normal state. The movement mechanism 300 is configured by a feed screw. The movement mechanism 300 has a feed screw shaft 310, a nut 320, two bearings 330 and 330, and a telescopic axis 340. The bearings 330 and 330 are fixed to the bottom surface of the bottom plate 7. The feed screw shaft 310 is rotatably supported by the bearings 330 and 330. The nut 320 is geared to the feed screw shaft 310. Here, a long hole 70 is formed in the front portion of the bottom plate 7 of the third embodiment. The lower end of the screen 5 projects on the lower side of the bottom plate 7 via the long hole 70. The nut 320 is fixed to the bottom surface of the screen 5. In addition, the long hole 70 is formed along the front and back direction to correspond with the moving range R of the screen 5. The telescopic axis 340 connects the rear end of the feed screw shaft 310 and the steering wheel 90.

FIG. 9 is a side view which shows the cargo bed 4 in the expanded state.

By rotation of the steering wheel 90, the feed screw shaft 310 rotates, and the nut 320 moves along the axial direction of the feed screw shaft 310. As a result, the screen 5 moves in the front and back direction.

The passengers can adjust the position, of the steering wheel 90 in the front and back direction by elongating and contracting the telescopic axis 340. In addition, a screw formed in the feed screw shaft 310 is preferably an acme screw.

Next, the interlocking device 500 is explained. The interlocking device 500 is a device which moves a rear seat 103 in conjunction with the screen 5. The interlocking device 500 is configured by a linkage mechanism.

In FIG. 8, the rear seat 103 has the rear main seat 31, the rear backrest 32, two support brackets 37 and 37, and a horizontal shaft 38. The two support brackets 37 and 37 are fixed to the lower end of the screen 5. The rear main seat 31 is rotatably supported by the two support brackets 37 and 37 via the horizontal shaft 38. The horizontal shaft 38 is a shaft of the right and left direction. The rear backrest 32 is fixed to the front face of the screen 5.

In FIG. 8, the interlocking device 500 is configured by two linkage mechanisms provided in the right and left of the rear seat 103, respectively. Each of the linkage mechanisms has a first shaft 501, a second shaft 502, and a link arm 510. The first shaft 501 is rotatably arranged in the front end portion of the rear main seat 31. The second shaft 502 is rotatably arranged in the front end portion of the side plate 141. The first shaft 501 and the second shaft 502 are rotatably arranged in both ends of the link arm 510.

In FIG. 8, the screen 5 is in the rear side position Q1, and the rear main seat 31 is in the use position P1. If the screen 5 moves forward by rotation of the steering wheel 90, the horizontal shaft 38 moves forward. Here, as the second shaft 502 is supported by the side plate 141, the second shaft 502 is not interlocked with the screen 5. In addition, the length of the link arm 510 does not change. Therefore, if the screen 5 moves forward, the link arm 510 rotates around the second shaft 502 and the first shaft 501 moves backward. As a result, the rear main seat 31 rotates backward around the horizontal shaft 38 and the rear main seat 31 stands up. As shown in FIG. 9, when the screen 5 reaches the front side position Q1, the rear main seat 31 is in the shunting position P2.

In the third embodiment, rotation of the steering wheel 90 not only moves the screen 5 in the front and back direction, but also moves the rear main seat 31 so as not to interfere with the screen 5.

Fourth Embodiment

Figure 10:
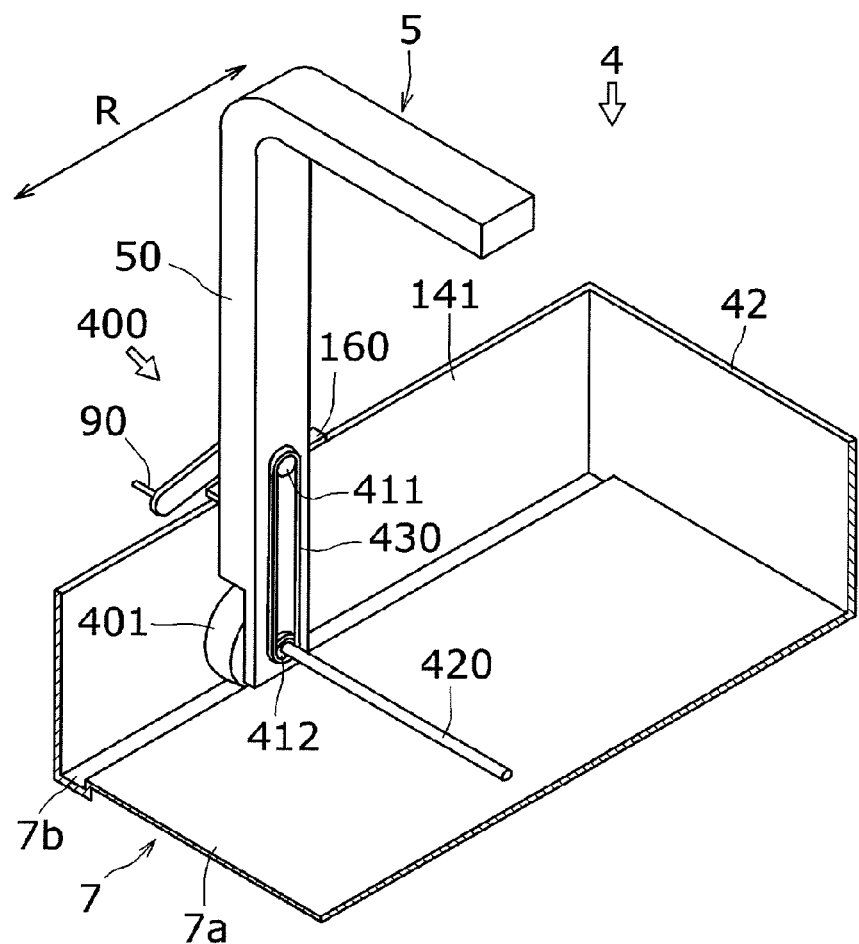
FIG. 10 is a diagrammatic perspective view which shows the cargo bed (the fourth embodiment).
Figure 11:
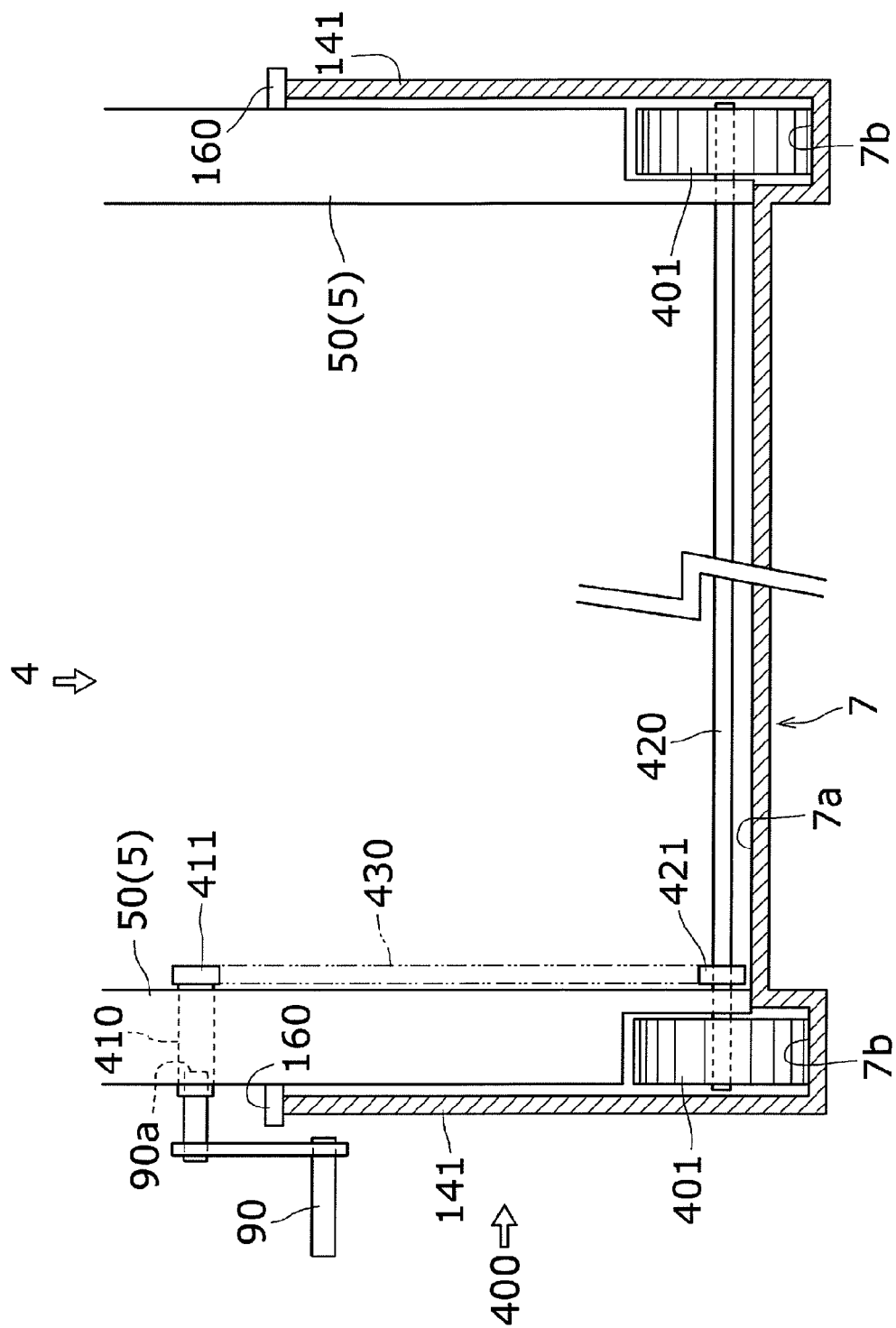
FIG. 11 is a front view which shows the cargo bed (the fourth embodiment).

FIGS. 10 and 11 show a fourth embodiment of the pick-up type utility vehicle 1. The fourth embodiment is the same as that of the first embodiment except for some points of difference. The fourth embodiment differs in the configuration of the cargo bed 4 from the first embodiment. The fourth embodiment has a movement mechanism 400 instead of the movement mechanism 100 in the first embodiment. In the fourth embodiment, the same numerals are used for the portions which are common in the first embodiment.

FIG. 10 is a diagrammatic perspective view which shows the cargo bed 4. In FIG. 10, the left lower side of the drawing sheet is the front side of the pick-up type utility vehicle 1. In FIG. 10, only a part of the cargo bed 4 is shown.

The fourth embodiment as well as the third embodiment has the two side plates 141 and 141 instead of the two side cases 41L and 41R in the first embodiment. The screen 5 moves in the moving range R. The screen 5 has a U-shaped frame 50 which is U-shaped in front view.

FIG. 11 is a front view which shows the cargo bed 4. The movement mechanism 400 is configured by a friction roller 401 which is in frictional contact with the bottom plate 7 of the cargo bed 4. The movement mechanism 400 has two friction rollers 401 and 401, a first shaft 410, a second shaft 420, a first sprocket 411, a second sprocket 421, and a chain belt 430.

The movement mechanism 400 is configured as follows. The first shaft 410 and the second shaft 420 are rotatably supported by the U-shaped frame 50. The distal portion 90a of the steering wheel 90 is engaged with the one end portion of the first shaft 410. The first sprocket 411 is fixed to the other end portion of the first shaft 410. Each of the two friction rollers 401 and 401 is fixed to the end portion of the second shaft 420. The second sprocket 421 is fixed to the second shaft 420. The chain belt 430 is wound around the first sprocket 411 and the second sprocket 421.

As shown in FIG. 11, the bottom plate 7 is configured by a plain surface portion 7*a*, and two guide portions 7*b* and 7*b*. In the right and left direction, the plain surface portion 7*a* is arranged in the center, and the two guide portions 7*b* and 7*b* are arranged in the end portions. The guide portion 7*b* is formed in a position lower than the plain surface portion 7*a* so that the distance between the second shaft 420 and the bottom plate 7 may not become large. The friction roller 401 is arranged in contact with the guide portion 7*b*.

The movement mechanism 400 has two sliders 160 as the guide mechanism of the screen 5. Each of the sliders 160 is fixed to both legs of U-shaped frame 50, respectively. The slider 160 is arranged in contact with the upper surface of the side plate 141. The slider 160 is a plate material which has a predetermined width in the front and back direction. The slider 160 prevents the screen 5 under movement from falling.

The passengers can move the screen 5 by rotating the steering wheel 90. First, the first sprocket 411 rotates by rotation of the steering wheel 90. By rotation of the first sprocket 411, the chain belt 430 rotatably drives the second sprocket 421. By rotation of the second sprocket 421, the two friction rollers 401 and 401 rotate via the second shaft 420. When the two friction rollers 401 and 401 rotate in frictional contact with the bottom plate 7, the screen 5 moves toward the front and back direction.

Other Embodiments

The present invention is not limited to the embodiments described above and includes various modification examples contemplated in the scope without departing from the contents described in the scope of the claims.

Figure 12:
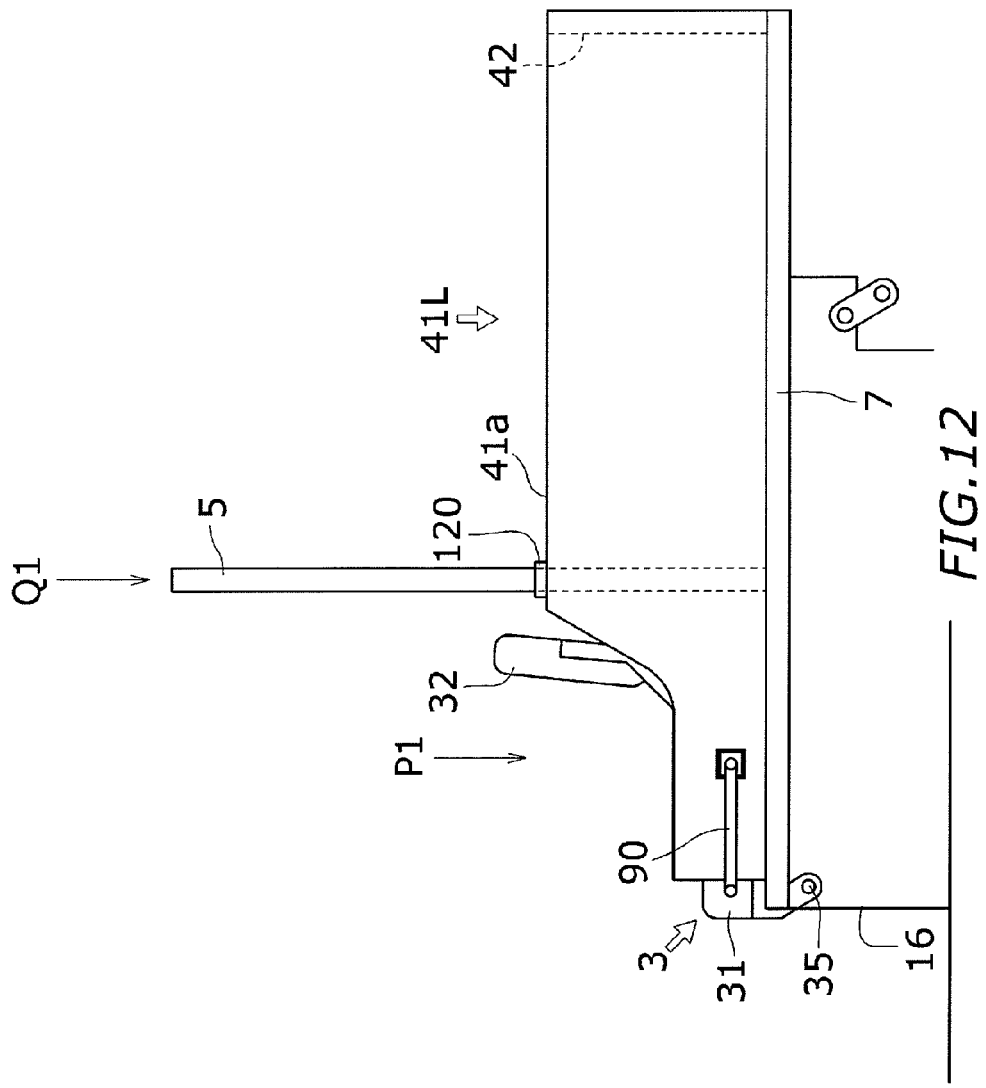
FIG. 12 is a side view which shows the cargo bed (other embodiment).
Figure 13:
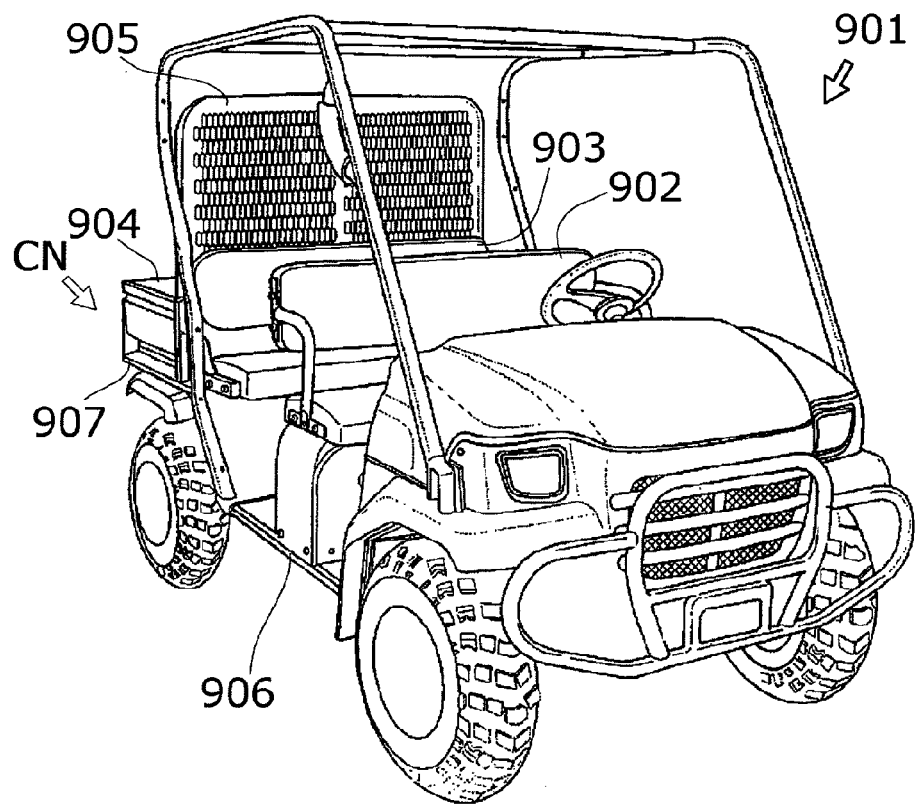
FIG. 13 is a diagrammatic perspective view which shows a prior art pick-up type utility vehicle.
Figure 14:
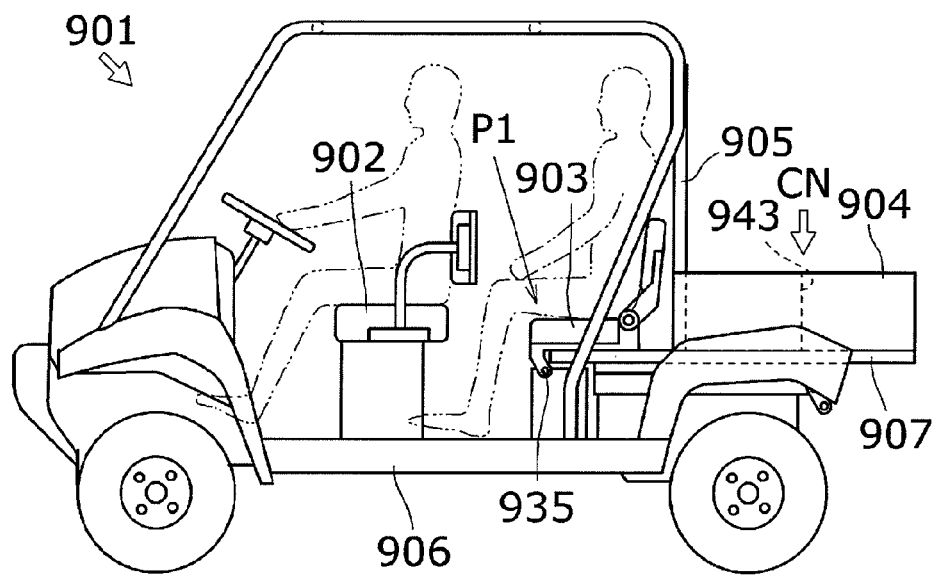
FIG. 14 is a side view which shows the prior art pick-up type utility vehicle in the normal state.
Figure 15:
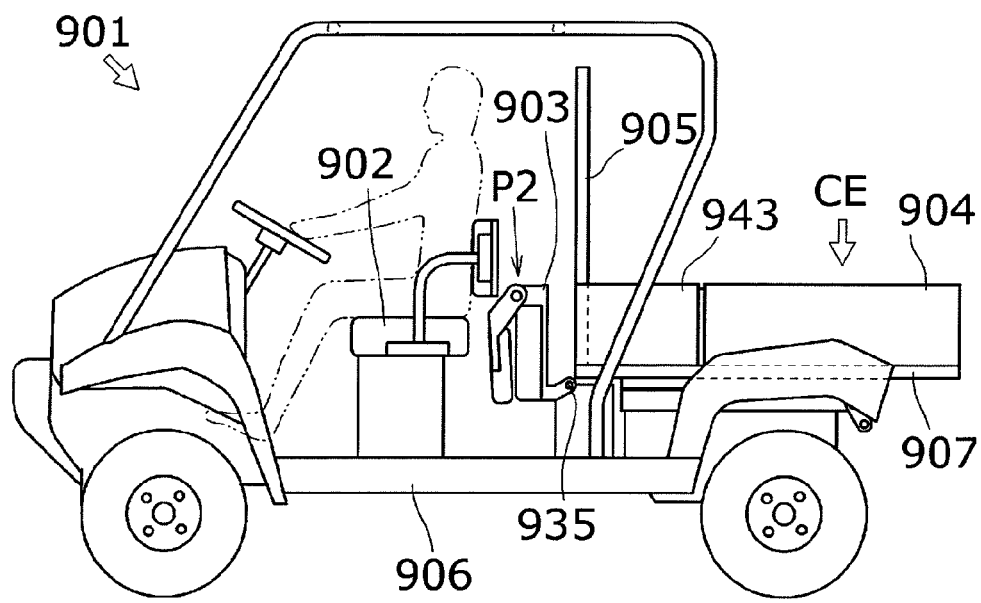
FIG. 15 is a side view which shows the prior art pick-up type utility vehicle in the expanded state.
Figure 16:
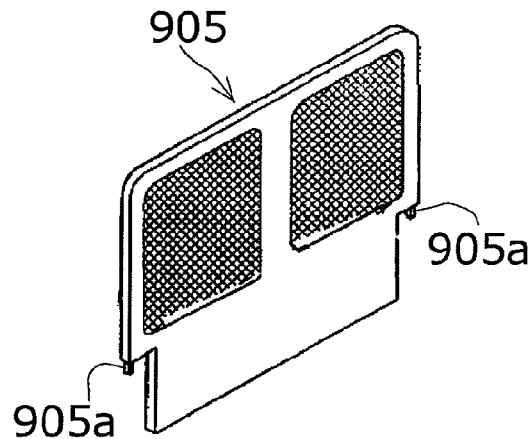
FIG. 16 is a diagrammatic perspective view which shows the screen of the prior art pick-up type utility vehicle.

FIG. 12 is a side view which shows the cargo bed 4 in a further embodiment. The side cases 41L and 41R are replaced with the configuration described in FIG. 12 instead of the configurations described in FIG. 3, FIG. 4, or FIG. 6. In FIG. 12, the front upper end portion of the side case 41L is dented so that it is easy for the passengers to move between the outside of the vehicle 1 and the seat 3.

The invention claimed is:

1. A pick-up type utility vehicle comprising:
a chassis;
a front seat;
a rear seat;
an expandable cargo bed; and
a screen separating between the rear seat and the cargo bed, wherein the front seat, rear seat and cargo bed are supported on the chassis,
the pick-up type utility vehicle further comprising:
an operating part for moving the screen; and
a movement mechanism moving the screen in a front and back direction by rotating the operating part,
wherein the movement of the screen works in conjunction with the rotation of the operating part.

2. The pick-up type utility vehicle according to claim 1, wherein the movement mechanism is configured by:
a sprocket rotating by a rotative force generated by operation of the operating part; and
a chain belt gearing the sprocket.

3. The pick-up type utility vehicle according to claim 1, wherein the movement mechanism is configured by a feed screw.

4. The pick-up type utility vehicle according to claim 1, wherein the movement mechanism is in frictional contact with the cargo bed and is configured by a roller rotating because of a rotative force.

5. The pick-up type utility vehicle according to claim 1, comprising an interlocking device which moves the rear seat in conjunction with the screen.

6. The pick-up type utility vehicle according to claim 1, wherein the operating part is removably arranged in the movement mechanism.

7. The pick-up type utility vehicle according to claim 1, wherein the movement mechanism comprises a feed screw extending along an axial direction of the vehicle, the feed screw engaging a lower portion of the screen.

8. The pick-up type utility vehicle according to claim 1, wherein the cargo bed includes two side cases forming sides of the cargo bed, and the movement mechanism is disposed in at least one of the side cases.

* * * * *